United States Patent
Katayama

(10) Patent No.: US 8,282,991 B2
(45) Date of Patent: Oct. 9, 2012

(54) PROCESS FOR PRODUCING HYDROPHOBIZED SILICON OXIDE-COATED METAL OXIDE PARTICLES COMPRISING PRIMARY AND SECONDARY HYDROPHOBIZING STEPS

(75) Inventor: Hajime Katayama, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 180 days.

(21) Appl. No.: 12/574,738

(22) Filed: Oct. 7, 2009

(65) Prior Publication Data

US 2010/0021712 A1    Jan. 28, 2010

Related U.S. Application Data

(63) Continuation of application No. PCT/JP2008/053102, filed on Feb. 22, 2008.

(30) Foreign Application Priority Data

Apr. 13, 2007    (JP) .................. 2007-105702

(51) Int. Cl.
  *B05D 1/34*   (2006.01)
  *B05D 3/02*   (2006.01)
  *B32B 5/16*   (2006.01)

(52) U.S. Cl. ........ 427/214; 427/215; 427/219; 427/220; 427/372.2; 427/384; 427/397.7; 5/403; 5/404; 5/405

(58) Field of Classification Search .......... 428/403–406; 427/214–220, 372.2, 384, 397.7
  See application file for complete search history.

(56) References Cited

U.S. PATENT DOCUMENTS

| 5,902,569 | A  | * | 5/1999 | Oshima et al. ............. 424/59 |
| 6,235,270 | B1 | * | 5/2001 | Ishii et al. ............... 424/59 |
| 6,534,044 | B1 | * | 3/2003 | Wada et al. .............. 424/59 |
| 6,773,814 | B2 | * | 8/2004 | Schumacher et al. ....... 428/404 |
| 7,255,735 | B2 | * | 8/2007 | Meyer et al. ............ 106/445 |
| 2004/0241189 | A1 | * | 12/2004 | Ishii et al. .......... 424/200.1 |
| 2006/0110542 | A1 | * | 5/2006 | Dietz et al. ............ 427/384 |
| 2006/0146394 | A1 | * | 7/2006 | Kaga et al. ............. 359/296 |
| 2008/0241730 | A1 | * | 10/2008 | Tuji et al. ............ 430/137.15 |
| 2008/0279595 | A1 | * | 11/2008 | Uezono ................. 399/263 |

FOREIGN PATENT DOCUMENTS

| DE | 10 2004 004 147 A1 | 8/2005 |
| JP | 07-003047 | 1/1995 |
| JP | 07-053910 | 2/1995 |
| JP | 07-286095 | * 10/1995 |
| JP | 10-292056 | 4/1998 |
| JP | 11-279358 | 10/1999 |
| JP | 2000-327322 | 11/2000 |
| JP | 2003-261321 | 9/2003 |
| JP | 2005-539113 | 12/2005 |
| JP | 2007-039323 | 2/2007 |
| WO | WO 03/104319 A1 | 12/2003 |
| WO | WO 2007/059841 A1 | 5/2007 |

* cited by examiner

*Primary Examiner* — Hoa (Holly) Le

(74) *Attorney, Agent, or Firm* — Oblon, Spivak, McClelland, Maier & Neustadt, L.L.P.

(57) ABSTRACT

Hydrophobized silicon oxide-coated metal oxide particles excellent in dispersibility in fluororesins, durability to fluorinated compounds and ultraviolet-shielding properties, and a fluororesin film excellent in transparency, weather resistance and ultraviolet-shielding properties comprising the hydrophobized silicon oxide-coated metal oxide particles, the hydrophobized silicon oxide-coated metal oxide particles being obtained by a process including a primary and a secondary hydrophobizing treatment.

18 Claims, No Drawings

PROCESS FOR PRODUCING HYDROPHOBIZED SILICON OXIDE-COATED METAL OXIDE PARTICLES COMPRISING PRIMARY AND SECONDARY HYDROPHOBIZING STEPS

TECHNICAL FIELD

The present invention relates to a process for producing hydrophobized silicon oxide-coated metal oxide particles, hydrophobized silicon oxide-coated metal oxide particles obtained by the production process, and a fluororesin film using them.

BACKGROUND ART

A fluororesin film can maintain weather resistance, transparency, stain resistance, etc. for a long period of time, and therefore such a film is applied to e.g. agricultural house films or outdoor building materials (such as roof materials).

The fluororesin film to be used for the application is required to have ultraviolet shielding properties from the following reasons:

(i) In a case where the fluororesin film is bonded to a base material via an adhesive to be used as an outdoor stuffs, the adhesive is deteriorated by ultraviolet light.

(ii) In a case where the fluororesin film is applied to agricultural house films, it is necessary to adjust the amount of ultraviolet light so as to improve e.g. colors, Brix or crop yields of plants to be cultivated. Further, in order to suppress activities of harmful insects in the agricultural house, it is necessary to shield the ultraviolet light.

As a fluororesin film having ultraviolet shielding properties, the following fluororesin film has been proposed.

(1) A fluororesin film containing titanium oxide particles or zinc oxide particles (Patent Document 1). However, the fluororesin film as the above (1) has the following problems:

(i) The dispersibility of titanium oxide particles or zinc oxide particles in a fluororesin is poor, and such particles are agglomerated and a fluororesin film is thus whitened, whereby transparency is deteriorated.

(ii) The fluororesin film is deteriorated by photocatalysis of the titanium oxide particles.

(iii) Zinc oxide particles are reacted with fluorinated compounds liberated from a fluororesin at the time of producing a fluororesin film or using it outside, whereby they are formed into zinc fluoride, and therefore the ultraviolet shielding properties are weakened.

As a fluororesin film having durability to fluorinated compounds and further containing zinc oxide particles having their dispersibility in the fluororesin improved, the following fluororesin film has been proposed.

(2) An amorphous silica-coated fluororesin film containing zinc oxide particles, wherein the amorphous silica is hydrophobized with ethyltriethoxysilane (Patent Document 2).

However, the fluororesin film as the above (2) is required to be further improved from the following points:

(i) Since such hydrophobized amorphous silica-coated zinc oxide particles are easily agglomerated, the dispersibility in a fluororesin is likely to be insufficient, whereby the transparency of the fluororesin film tends to be deteriorated.

(ii) Since a pulverizing step is needed at the time of producing hydrophobized amorphous silica-coated zinc oxide particles, the zinc oxide particles are likely to be insufficiently coated with amorphous silica, whereby the resistance to fluorinated compounds tends to be insufficient.

Patent Document 1: JP-A-7-003047
Patent Document 2: JP-A-11-279358

DISCLOSURE OF THE INVENTION

Object to be Accomplished by the Invention

It is an object of the present invention to provide are process for producing hydrophobized silicon oxide-coated metal oxide particles excellent in dispersibility in fluororesins, durability to fluorinated compounds and ultraviolet-shielding properties; hydrophobized silicon oxide-coated metal oxide particles excellent in dispersibility in fluororesins, durability to fluorinated compounds and ultraviolet-shielding properties; and a fluororesin film excellent in transparency, weather resistance and ultraviolet-shielding properties.

Means to Accomplish the Object

Namely, the present invention provides the following:

(1) A process for producing hydrophobized silicon oxide-coated metal oxide particles, which comprises:

(a) a step of adding a silicon oxide precursor to a dispersion of metal oxide particles to form a silicon oxide film on the surface of metal oxide particles thereby to obtain a dispersion of silicon oxide-coated metal oxide particles, (b) a step of adding a compound represented by the following formula (1) or (2) and a silicon oxide precursor to the above dispersion of silicon oxide-coated metal oxide particles thereby to obtain a dispersion of primarily hydrophobized silicon oxide-coated metal oxide particles,

$$R^1{}_{4-n}Si(OR^2)_n \quad (1)$$

$$R^3{}_3Si-NH-SiR^3{}_3 \quad (2)$$

in the above formulae (1) and (2), $R^1$ is a $C_{1-9}$ alkyl group, each of $R^2$ and $R^3$ which are independent of each other, is an alkyl group, and n is an integer of from 1 to 3, (c) a step of adding a silanol-protective agent to the above dispersion of primarily hydrophobized silicon oxide-coated metal oxide particles thereby to obtain a dispersion of secondarily hydrophobized silicon oxide-coated metal oxide particles, and (d) a step of drying the above secondarily hydrophobized silicon oxide-coated metal oxide particles thereby to obtain the hydrophobized silicon oxide-coated metal oxide particles.

(2) The process for producing hydrophobized silicon oxide-coated metal oxide particles according to the above (1), wherein in the above dispersion of metal oxide particles, the 90% particle size of the metal oxide particles is from 10 to 100 nm.

(3) The process for producing hydrophobized silicon oxide-coated metal oxide particles according to the above (1) or(2), wherein the silicon oxide film in the above hydrophobized silicon oxide-coated metal oxide particles has a thickness of from 1 to 20 nm.

(4) The process for producing hydrophobized silicon oxide-coated metal oxide particles according to any one of the above (1) to (3), wherein the above metal oxide particles are zinc oxide particles.

(5) The process for producing hydrophobized silicon oxide-coated metal oxide particles according to any one of the above (1) to (4), wherein the above silicon oxide precursor is tetraethoxysilane.

(6) The process for producing hydrophobized silicon oxide-coated metal oxide particles according to any one of the above (1) to (5), wherein $R^2$ in the above formula (1) is a methyl group.
(7) The process for producing hydrophobized silicon oxide-coated metal oxide particles according to any one of the above (1) to (6), wherein the compound represented by the above formula (1) is isobutyltrimethoxysilane or hexyltrimethoxysilane.
(8) The process for producing hydrophobized silicon oxide-coated metal oxide particles according to any one of the above (1) to (5), wherein the compound represented by the above formula (2) is hexamethyldisilazane.
(9) The process for producing hydrophobized silicon oxide-coated metal oxide particles according to any one of the above (1) to (8), wherein the above silanol-protective agent is hexamethyldisilazane.
(10) Hydrophobized silicon oxide-coated metal oxide particles obtained by the process as defined in any one of the above (1) to (9).
(11) The hydrophobized silicon oxide-coated metal oxide particles according to the above (10), which have a methanol hydrophobizing degree being from 45 to 75%.
(12) A fluororesin film comprising hydrophobized silicon oxide-coated metal oxide particles obtained by the process as defined in any one of the above (1) to (9) and a fluororesin.
(13) The fluororesin film according to the above (12), which has a light transmittance at 360 nm being at most 5%, and further has a haze value being at most 15%.
(14) The fluororesin film according to the above (12), which has a light transmittance at 300 nm being at most 5%, and further has a haze value being at most 15%.
(15) The fluororesin film according to any one of the above (12) to (14), wherein the fluororesin is an ethylene/tetrafluoroethylene type copolymer.

Effect of the Invention

According to the process for producing hydrophobized silicon oxide-coated metal oxide particles of the present invention, it is possible to produce hydrophobized silicon oxide-coated metal oxide particles excellent in dispersibility in fluororesins, durability to fluorinated compounds and ultraviolet-shielding properties.

The hydrophobized silicon oxide-coated metal oxide particles of the present invention are excellent in dispersibility in fluororesins, durability to fluorinated compounds and ultraviolet-shielding properties.

The fluororesin film of the present invention is excellent in transparency, weather resistance and ultraviolet-shielding properties.

BEST MODE FOR CARRYING OUT THE INVENTION

In the present specification, the compound represented by the formula (1) will be referred to as the compound (1). The same applies to the compounds represented by the other formulae.

Hydrophobized Silicon Oxide-Coated Metal Oxide Particles

The process for producing hydrophobized silicon oxide-coated metal oxide particles of the present invention is a process comprising the following steps.

(a) A step of adding a silicon oxide precursor to a dispersion of metal oxide particles to form a silicon oxide film on the surface of metal oxide particles thereby to obtain a dispersion of silicon oxide-coated metal oxide particles.

(b) A step of adding a compound (1) or (2) and a silicon oxide precursor to the dispersion of silicon oxide-coated metal oxide particles thereby to obtain a dispersion of primary hydrophobized silicon oxide-coated metal oxide particles,

In the above formulae (1) and (2), $R^1$ is a $C_{1-9}$ alkyl group, each of $R^2$ and $R^3$ which are independent of each other, is an alkyl group, and n is an integer of from 1 to 3.

(c) A step of adding a silanol-protective agent to the dispersion of primary hydrophobized silicon oxide-coated metal oxide particles thereby to obtain a dispersion of secondarily hydrophobized silicon oxide-coated metal oxide particles.

(d) A step of drying the secondarily hydrophobized silicon oxide-coated metal oxide particles to obtain the hydrophobized silicon oxide-coated metal oxide particles.

Step (a):

Specifically, to a dispersion obtained by dispersing metal oxide particles in a dispersion medium, water and an organic solvent are added as the case requires, further an alkali or an acid is added thereto, and then a silicon oxide precursor is added thereto, whereby the silicon oxide precursor is hydrolyzed by the alkali or the acid, and silicon oxide is deposited on the surface of the metal oxide particles thereby to form a silicon oxide film, whereby the dispersion of the silicon oxide-coated metal oxide particles are obtained.

As the metal oxide particles, zinc oxide particles, titanium oxide particles, cerium oxide particles or iron oxide particles may, for example, be mentioned, but zinc oxide particles are preferred since ultraviolet light at a wavelength of at most 360 nm can be adsorbed over a wide wavelength region and transparency of visible light is high.

In the dispersion of metal oxide particles, the 90% particle size of the metal oxide particles is preferably from 10 to 100 nm, more preferably from 20 to 80 nm. When the 90% particle size of the metal oxide particles is at least 10 nm, the surface area per mass of the metal oxide particles becomes not too large, whereby it is possible to suppress the amount of silicon oxide required for coating them. Here, in the case of coating them with a silicon oxide film having the same thickness, on the assumption that the particle size distribution is the same, the metal oxide particles having a 90% particle size of 10 nm require 10 times the amount of silicon oxide, as compared with metal oxide particles having a 90% particle size of 100 nm. Further, when the 90% particle size of the metal oxide particles is at least 10 nm, it is possible to suppress the amount of the hydrophobized silicon oxide-coated metal oxide particles required for obtaining sufficient ultraviolet-shielding properties. When the 90% particle size of the metal oxide particles is at most 100 nm, it is possible to obtain a fluororesin film having sufficient transparency.

"90% particle size" means a particle size in which, in the particle size distribution based on volume, the total of volume % from the side where the particle size is smaller, is 90%. For example, In a case where the 90% particle size is 100 nm, 90 volume % of the particles has a particle size of at most 100 nm, in the total amount of the particles (100 volume %).

In the dispersion of the metal oxide particles, 90% particle size of the metal oxide particles is not a primary particle size of the metal oxide particles, but is a size (measurement value)

being practically present in the dispersion, and such a value is measured using commercially available particle size distribution measuring device.

The concentration of the metal oxide particles is preferably from 1 to 20 mass %, more preferably from 1 to 10 mass %, in the dispersion (100 mass %). When the concentration of the metal oxide particles is at least 1 mass %, the production efficiency of the hydrophobized silicon oxide-coated metal oxide particles becomes good. When the concentration of the metal oxide particles is at most 20 mass %, the metal oxide particles hardly agglomerate, and it is thereby possible to obtain a fluororesin film having sufficient transparency.

As the dispersion medium, water; an organic solvent such as an alcohol (such as methanol, ethanol or isopropanol), a ketone (such as acetone or methyl ethyl ketone); or a mixture thereof may be mentioned.

As a method of preparing the dispersion of the metal oxide particles, the following methods may be mentioned.

(a-1) A method of adding metal oxide particles to a dispersion medium, followed by pulverizing the metal oxide particles by a pulverizer (such as a beads mill).

(a-2) A method of synthesizing metal oxide particles in a dispersion medium.

(a-3) A method of synthesizing metal oxide precursor particles in a dispersion medium, followed by heating the metal oxide precursor particles to be metal oxide particles.

As the organic solvent to be added to the dispersion, an alcohol (such as methanol, ethanol or isopropanol) or a ketone (such as acetone or methyl ethyl ketone) may, for example, be mentioned.

The alkali may be an alkali having no hydrocarbon groups or an alkali having hydrocarbon groups. Among them, in order to prevent scorches at the time of kneading with the fluororesin and thereby to prevent coloration of the fluororesin film, an alkali having no hydrocarbon groups is preferred.

As the alkali having no hydrocarbon group, potassium hydroxide, sodium hydroxide, ammonia, ammonium carbonate or ammonium hydrogen carbonate may, for example, be mentioned, and from the viewpoint of weather resistance (moisture permeability to silicon oxide film), it is preferred to employ ammonia which is removable by heating.

The alkali having hydrocarbon groups may, for example, be dimethylamine, triethylamine or aniline.

The amount of an alkali to be used is preferably such an amount that the pH of the dispersion is from 8.5 to 10.5, more preferably from 9.0 to 10.0. When the pH of the dispersion is at least 8.5, the reaction rate does not tend to be too slow, and it is possible to suppress gelation of the dispersion. When the pH of the dispersion is at most 10.5, it is possible to suppress the dissolution of zinc oxide particles.

The acid may, for example, be hydrochloric acid or nitric acid. Further, since zinc oxide particles are dissolved in an acid, in the case of using the zinc oxide particles as metal oxide particles, it is preferred to hydrolyze the silicon oxide precursor by an alkali.

The amount of the acid to be used is preferably such an amount that the pH of the dispersion is from 3.5 to 5.5, more preferably from 4.0 to 5.0.

As the silicon oxide precursor, a silicate or an alkoxysilane may be mentioned.

As the silicate, sodium silicate or potassium silicate may, for example, be mentioned.

As the alkoxysilane, tetramethoxysilane, tetraethoxysilane (hereinafter referred to as TEOS), tetra n-propoxysilane or tetraisopropoxysilane may, for example, be mentioned.

As the silicon oxide precursor, from the viewpoint of forming it into a dense silicon oxide film for preventing permeation of the fluorinated compounds, an alkoxysilane is preferred, and from the viewpoint of appropriate reaction rate, TEOS is preferred. In a case where the reaction rate is moderately controlled (namely, the reaction rate is not too fast), silicon oxide-coated metal oxide particles obtainable is not likely to be agglomerated. Accordingly, from the following reason (i), the transparency of the fluororesin film becomes good. Further, from the following reason (ii), the durability of the hydrophobized silicon oxide-coated metal oxide particles to fluorinated compounds becomes also good.

(i) When the silicon oxide-coated metal oxide particles are not agglomerated, the particle size of the hydrophobized silicon oxide-coated metal oxide particles becomes sufficiently small. As a result, the transparency of the fluororesin film containing the hydrophobized silicon oxide-coated metal oxide particles becomes good.

(ii) When the silicon oxide-coated metal oxide particles are not agglomerated, hydrophobized silicon oxide-coated metal oxide particles being agglomerated, are also not obtained. Accordingly, it is not necessary to apply e.g. shear force to the hydrophobized silicon oxide-coated metal oxide particles to split the hydrophobized silicon oxide-coated metal oxide particles into particles smaller than the agglomerated particles. Accordingly, portions which are partly uncoated by the silicon oxide film or portions which are not hydrophobized, are never formed on the hydrophobized silicon oxide-coated metal oxide particles, and therefore no fluorinated compounds can invade from such a portion. Accordingly, the durability of the hydrophobized silicon oxide-coated metal oxide particles to the fluorinated compounds becomes good.

The amount of the silicon oxide precursor to be used is such an amount that the thickness of the silicon oxide film deposited on the surface of the metal oxide particles becomes preferably from 1 to 20 nm, more preferably from 2 to 10 nm. When the thickness of the silicon oxide film is at least 1 nm, the durability of the hydrophobized silicon oxide-coated metal oxide particles to the fluorinated compounds becomes good. When the thickness of the silicon oxide film is at most 20 nm, the ratio of the silicon oxide to the metal oxide particles is not too high, and therefore it is not necessary to increase the amount of the hydrophobized silicon oxide-coated metal oxide particles contained in the fluororesin film so much so as to obtain sufficient ultraviolet-shielding properties. Further, it is possible to suppress the amount of the hydrophobized silicon oxide-coated metal oxide particles contained in the fluororesin film, whereby the moldability of the fluororesin film becomes good, and further the mechanical strength becomes high.

Specifically, the amount (as calculated as $SiO_2$) of the silicon oxide precursor to be used is preferably from 10 to 200 parts by mass, more preferably from 25 to 150 parts by mass, based on 100 parts by mass of metal oxide particles.

The thickness of the silicon oxide film can be calculated in such a manner that the surface area of metal oxide particles obtained by drying a dispersion of the metal oxide particles is measured by means of a nitrogen adsorption method, followed by calculation from the above surface area and the amount of the silicon oxide precursor. Further, in the step (a) of the present invention, the concentration of the silicon oxide precursor is adjusted, and therefore a core of silicon oxide consisting of only a silicon oxide precursor is not formed, whereby all the silicon oxide precursor is deposited as a silicon oxide film on the surface of the metal oxide particles. The concentration (as calculated as $SiO_2$) of the silicon oxide precursor in the dispersion is preferably from 0.00005 to 5 equivalent/L, more preferably from 0.005 to 3 equivalent/L.

The silicon oxide precursor may be added as it is or may be properly diluted with a solvent as the case requires. The solvent may, for example, be an alcohol or a ketone.

In the step (a), the silicon oxide precursor may be added to the dispersion of the metal oxide particles all at once, or the silicon oxide precursor may successively be added to the dispersion of the metal oxide particles by means of e.g. dropwise addition.

The temperature of the dispersion is preferably from 0 to 50° C., more preferably from 10 to 40° C. When the temperature is at least 0° C., the reaction rate is not too slow, and it takes not so long time to deposit silicon oxide. When the temperature is at most 50° C., the metal oxide particles or silicon oxide-coated metal oxide particles obtainable do not tend to be agglomerated, whereby the particle size of the hydrophobized silicon oxide-coated metal oxide particles becomes sufficiently small. As a result, the transparency of the fluororesin film containing the hydrophobized silicon oxide-coated metal oxide particles becomes good.

In order that the pH of the dispersion are always to be within the above-mentioned range, it is preferred to properly add an alkali or an acid to the dispersion.

The concentration of the silicon oxide-coated metal oxide particles (solid content) obtainable is preferably from 1 to 40 mass %, more preferably from 3 to 30 mass % in the dispersion (100 mass %).

Step (b):

Specifically, to the dispersion of the silicon oxide-coated metal oxide particles obtained in the step (a), the compound (1) or (2) and the silicon oxide precursor are added, and the compound (1) or (2) and the silicon oxide precursor are hydrolyzed, whereby the compound (1) or (2), the silicon oxide precursor and silicon oxide coating the metal oxide particles are reacted with one another to obtain a dispersion of primarily hydrophobized silicon oxide-coated metal oxide particles.

$$R^1_{4-n}Si(OR^2)_n \quad (1)$$

$$R^3_3Si\text{—}NH\text{—}SiR^3_3 \quad (2)$$

$R^1$ is a $C_{1-9}$ alkyl group, preferably a $C_{4-6}$ alkyl group. When the number of carbon atoms in the alkyl group is at least 1, it is possible to suppress agglomeration of the hydrophobized silicon oxide-coated metal oxide particles since the alkyl group acts as steric hindrance, and further the hydrophobizing degree of the hydrophobized silicon oxide-coated metal oxide particles also increases. Accordingly, the dispersibility of the hydrophobized silicon oxide-coated metal oxide particles in the fluororesin becomes good. When the number of carbon atoms of the alkyl group is at most 9, the solubility in the dispersion medium is also high, and the reactivity with e.g. a silicon oxide precursor becomes good.

$R^2$ is an alkyl group, preferably a $C_{1-3}$ alkyl group, more preferably a $C_1$ alkyl group. As the number of carbon atoms of the alkyl group becomes small, the rate of hydrolysis becomes high, and the rate of the reaction with e.g. a silicon oxide precursor becomes also high. Further, the transparency of the fluororesin film containing hydrophobized silicon oxide-coated metal oxide particles obtained becomes high.

n is an integer of from 1 to 3, and 3 is preferred from the viewpoint of reactivity with e.g. the silicon oxide precursor.

$R^3$ is an alkyl group, preferably a $C_{1-2}$ alkyl group, more preferably a $C_1$ alkyl group. As the number of carbon atoms of the alkyl group becomes small, the reactivity with the silanol group becomes good.

As the compounds (1) and (2), one which is soluble in the dispersion after thydrolysis is preferred.

From the above point, as the compound (1), methyltrimethoxysilane, ethyltrimethoxysilane, n-propyltrimethoxysilane, dimethyldimethoxysilane, diisopropyldimethoxysilane, diisobutyldimethoxysilane, isobutyltrimethoxysilane, n-hexyltrimethoxysilane or n-octyltrimethoxysilane is preferred, and isobutyltrimethoxysilane or n-hexyltrimethoxysilane is particularly preferred.

As the compound (2), hexamethyldisilazane or diethyltetramethyldisilazane is preferred, particularly hexamethyldisilazane is preferred.

The amount of the compound (1) to be used is preferably from 0.01 to 5 milli equivalent (mol), more preferably from 0.05 to 1 milli equivalent (mol), to 1 g of the silicon oxide-coated metal oxide particles, and the amount of the compound (2) to be used is preferably from 0.005 to 2.5 milli equivalent (mol), more preferably from 0.025 to 0.5 milli equivalent (mol) to 1 g of the silicon oxide-coated metal oxide particles.

The compound (1), the compound (2) and the silicon oxide precursor may be used as they are, or may properly be diluted with a solvent as the case requires. As the solvent, an alcohol (such as methanol or ethanol) or a ketone (such as acetone) may, for example, be mentioned.

As the silicon oxide precursor, the silicon oxide precursor used in the step (a) may be mentioned. The amount (as calculated as $SiO_2$) of the silicon oxide precursor to be used is preferably from 1 to 30 equivalent to 1 equivalent of the compound (1), and such an amount is preferably from 2 to 60 equivalent to 1 equivalent of the compound (2). Like the step (a), the silicon oxide precursor may be added as it is or may be properly diluted with a solvent as the case requires.

In the step (b), it is preferred that the compound (1) and the silicon oxide precursor are added to the dispersion substantially simultaneously. Since the compound (1) has a low reactivity with a silanol group of silicon oxide coating the metal oxide particles, firstly, the compound (1) and the silicon oxide precursor are hydrolyzed to react them. Then, the silicon oxide precursor reacted with the compound (1) or (2) and bonded thereto, is reacted with a silanol group of silicon oxide coating the metal oxide particles.

The temperature of the dispersion is preferably from 20 to 80° C., more preferably from 40 to 60° C.

The pH of the dispersion preferably has the same range as in the step (a). Further, it is preferred that an alkali or an acid is properly added to the dispersion so that the pH of the dispersion are always to be in such a range.

The concentration of the primarily hydrophobized silicon oxide-coated metal oxide particles (solid content) obtainable is preferably from 1 to 50 mass %, more preferably from 5 to 40 mass % in the dispersion (100 mass %).

Step (c):

Specifically, a silanol-protective agent is added to the dispersion of the primarily hydrophobized silicon oxide-coated metal oxide particles obtained in the step (b) to hydrolyze the silanol-protective agent, whereby the silanol-protective agent and a silanol group remaining in the primarily hydrophobized silicon oxide-coated metal oxide particles are made to react with each other to obtain a dispersion of secondarily hydrophobized silicon oxide-coated metal oxide particles.

The silanol-protective agent is a compound having only one functional group to be reacted with the silanol group after the hydrolysis. The silanol-protective agent is preferably the compound (2) or the compound (3).

$$R^3_3Si\text{—}NH\text{—}SiR^3_3 \quad (2)$$

$$R^4_3SiOR^5 \quad (3)$$

Each of $R^3$, $R^4$ and $R^5$ which are independent of each other, is an alkyl group, preferably a $C_{1-2}$ alkyl group, more preferably a $C_1$ alkyl group. As the number of carbon atoms of the alkyl group becomes small, the reactivity with the silanol group becomes good.

The compound (2) may, for example, be hexamethyldisilazane or diethyltetramethyldisilazane.

The compound (3) may, for example, be trimethylmethoxysilane, trimethylethoxysilane, propyldimethylmethoxysilane or octyldimethylmethoxysilane may, for example, be mentioned.

As the silanol-protective agent, from the viewpoint of reactivity with the silanol group, hexamethyldisilazane is particularly preferred.

The amount of the silanol-protective agent to be used is preferably such an amount that the methanol hydrophobizing degree of the hydrophobized silicon oxide-coated metal oxide particles obtained in the step (d) becomes from 45 to 75%.

Specifically, the amount of the silanol-protective agent to be used is preferably from 1 to 200 parts by mass, more preferably from 5 to 200 parts by mass, based on 100 parts by mass of the primarily hydrophobized silicon oxide-coated metal oxide particles. Here, an unreacted silanol-protective agent and a dimer obtained by reacting the silanol-protecitve agents with each other, are volatilized in the step (d) and at the time of kneading with the fluororesin, and therefore influences such as agglomeration of the hydrophobized silicon oxide-coated metal oxide particles are not shown by such silanol-protective agents.

The silanol-protective agent may be added as it is, or may be properly diluted with a solvent as the case requires. As the solvent, an alcohol (such as methanol or ethanol) or a ketone (such as acetone) may, for example, be mentioned.

The temperature of the dispersion is preferably from 20 to 80° C., more preferably from 40 to 60° C. When the temperature is at least 20° C., the reaction readily proceeds, and it does not take a time for secondary hydrophobization treatment. When the temperature is at most 80° C., an alcohol in the dispersion hardly volatilized, and thus is safe.

It is preferred that the range of the pH of the dispersion is the same as in the step (a). Further, it is preferred that an alkali or an acid is properly added to the dispersion so that the pH of the dispersion is always in the above range. Further, in the case of using a silanol-protective agent which can produce an alkali due to hydrolysis, such as a compound (2), it is not necessary to adjust pH.

After the secondary hydrophobization treatment, secondarily hydrophobized silicon oxide-coated metal oxide particles may be agglomerated in the dispersion.

The concentration of the secondarily hydrophobized silicon oxide-coated metal oxide particles (solid content) obtainable is preferably from 1 to 50 mass %, more preferably from 5 to 40 mass %, in the dispersion (100 mass %).

Step (d):

As a method of drying the secondarily hydrophobized silicon oxide-coated metal oxide particles, the following methods may be mentioned.

(d-1) A method of heating the dispersion of the secondarily hydrophobized silicon oxide-coated metal oxide particles to volatilize e.g. a dispersion medium.

(d-2) A method of separating the dispersion of the secondarily hydrophobized silicon oxide-coated metal oxide particles into a solid and liquid, followed by drying a solid content.

(d-3) A method of spraying e.g. the dispersion of the secondarily hydrophobized silicon oxide-coated metal oxide particles into heated gas by using a spray dryer to volatilize e.g. a dispersion medium (spray drying method).

(d4) A method of cooling and depressurizing the dispersion of the secondarily hydrophobized silicon oxide-coated metal oxide particles to sublime e.g. a dispersion medium (freeze-drying method).

As the drying method, the method of (d-3) is preferred from the following points.

(i) Since the time for the heating is short, e.g. an alkyl group bonded to the surface by primary hydrophobized treatment and secondary hydrophobized treatment tends to hardly disappear, and it possible to suppress production of a silanol group, namely the lowering of the hydrophobization degree of the hydrophobized silicon oxide-coated metal oxide particles. Accordingly, it is possible to obtain both good dispersibility of the hydrophobized silicon oxide-coated metal oxide particles in the fluororesin and good durability to fluorinated compounds.

(ii) Since the time for the heating is short, it is possible to suppress bonding of the silanol groups to one another, which remain in the hydrophobized silicon oxide-coated metal oxide particles, whereby it is possible to suppress strong agglomeration of the hydrophobized silicon oxide-coated metal oxide particles to one another. Accordingly, it is possible to obtain good dispersibility of the hydrophobized silicon oxide-coated metal oxide particles in the fluororesin.

(iii) As compared with the freeze-drying method, it is possible to use a simple device for the drying.

The heat drying temperature is preferably from 100 to 250° C., more preferably from 100 to 150° C. When the heat drying temperature is at least 100° C., it is possible to suppress deterioration of the handling ability due to insufficiency of the drying. Further, since the amount of residues can be reduced, it is possible to suppress coloration of the fluororesin film due to e.g. thermal decomposition of the residues. When the heat drying temperature is at most 250° C., e.g. the alkyl group bonded to the surface by primary hydrophobization treatment and secondary hydrophobization treatment hardly disappears. Further, it is possible to suppress the bonding of the silanol groups to one another, which remain in the hydrophobization silicon oxide-coated metal oxide particles.

In the above-mentioned process for producing hydrophobized silicon oxide-coated metal oxide particles of the present invention, the silicon oxide precursor is added to the dispersion of the metal oxide particles thereby to deposit silicon oxide on the surface of the metal oxide particles, whereby the silicon oxide film is coated with the metal oxide fine particles, and therefore it is possible to obtain hydrophobized silicon oxide-coated metal oxide particles excellent in the durability to fluorinated compounds and ultraviolet-shielding properties.

Further, in the above-mentioned process for producing hydrophobized silicon oxide-coated metal oxide particles of the present invention, the silicon oxide-coated metal oxide particles are primarily hydrophobized by the compound (1) or (2) and the silicon oxide precursor, and further the primarily hydrophobized silicon oxide-coated metal oxide particles are secondarily hydrophobized by the silanol-protective agent, and therefore it is possible to obtain hydrophobized silicon oxide-coated metal oxide particle excellent in dispersibility in fluororesins and durability to fluorinated compounds from the following reasons.

(i) When the silicon oxide-coated metal oxide particles are primarily hydrophobized by the compound (1) or (2), a silicon oxide precursor is used in combination, whereby the silicon oxide precursor can compensate the low reactivity of the compound (1) or (2), and therefore the alkyl group derived from the compound (1) or (2) can sufficiently be introduced independently on the surface of the silicon oxide-coated metal oxide particles. Further, the hydrophobization treatment is carried out in the step (c) without drying the dispersion, and therefore the compound (1) or (2) having the hydrophobized silicon oxide-coated metal oxide particles bonded to one another is not present.

(ii) When the silicon oxide-coated metal oxide particles are primarily hydrophobized by the compound (1) or (2), the silicon oxide precursor is used in combination, whereby the compound (1) or (2) can sufficiently undergoes the reaction, and an unreacted compound (1) or (2) is thus reduced. Accordingly, the hydrophobized silicon oxide-coated metal oxide particles are never agglomerated by reaction of such an unreacted compound (1) or (2) with the silanol group remaining in the hydrophobized silicon oxide-coated metal oxide particles in e.g. the step (d). Accordingly, it is possible to obtain good dispersibility of the hydrophobized silicon oxide-coated metal oxide particles in the fluororesin.

(iii) Since the amount of the unreacted compound (1) or (2) is small, the hydrophobized silicon oxide-coated metal oxide particles never bonded strongly to one another by the reaction of the unreacted compound (1) or (2) with the silanol group remaining in the hydrophobized silicon oxide-coated metal oxide particles in e.g. step (d). Accordingly, even when the hydrophobized silicon oxide-coated metal oxide particles are agglomerated, they may readily be dispersed again, and at that time, the silicon oxide film never spalls from the hydrophobized silicon oxide-coated metal oxide particles. Accordingly, for example, the durability of hydrophobized amorphous silica-coated zinc oxide particles to fluorinated compounds never deteriorates.

(iv) Since the primarily hydrophobized silicon oxide-coated metal oxide particles are secondarily hydrophobized by the silanol protective agent, it is possible to sufficiently introduce an alkyl group derived from the silanol-protective agent to the silanol group remaining in the primarily hydrophobized silicon oxide-coated metal oxide particles. The alkyl group is not chemically bonded thereto, and its cohesive force is small, and therefore it is possible to suppress strong agglomeration of hydrophobized silicon oxide-coated metal oxide particles, and further the hydrophobizing degree of the hydrophobized silicon oxide-coated metal oxide particles increases. Accordingly, the dispersibility of the hydrophobized silicon oxide-coated metal oxide particles in the fluororesins becomes good.

(v) The primarily hydrophobized silicon oxide-coated metal oxide particles are secondarily hydrophobized by the silanol-protective agent to reduce the silanol group remaining in the primarily hydrophobized silicon oxide-coated metal oxide particles, and further the distance between the hydrophobized silicon oxide-coated metal oxide particles is kept due to the alkyl group introduced by the primary hydrophobization treatment, whereby it is possible to suppress the reaction of the remaining silanol groups with one another, and it is thereby possible to prevent the strong agglomeration of the hydrophobized silicon oxide-coated metal oxide particles. Accordingly, the dispersibility of the hydrophobized silicon oxide-coated metal oxide particles in the fluororesins becomes good.

(vi) Further, the remaining silanol groups are reduced, and further the distance between the hydrophobized silicon oxide-coated metal oxide particles is kept due to the alkyl group introduced by the primary hydrophobization treatment, whereby it is possible to suppress the reaction of the remaining silanol groups with one another, and the hydrophobized silicon oxide-coated metal oxide particles are unlikely to be strongly bonded to one another. Accordingly, even if the hydrophobized silicon oxide-coated metal oxide particles are agglomerated, they may easily be dispersed again, and at that time, the silicon oxide film never spalls from the hydrophobized silicon oxide-coated metal oxide particles. Accordingly, durability of the hydrophobized amorphous silica-coated zinc oxide particles to fluorinated compounds is never deteriorated.

Hydrophobized Silicon Oxide-Coated Metal Oxide Particles

The hydrophobized silicon oxide-coated metal oxide particles of the present invention is hydrophobized silicon oxide-coated metal oxide particles obtained by the process of the present invention.

The methanol hydrophobizing degree of the hydrophobized silicon oxide-coated metal oxide particles is preferably from 45 to 75%, more preferably from 55 to 75%.

Here, preferred methanol hydrophobizing degree varies depending upon the type of fluororesins to be used for the fluororesin film. When the fluororesin is an ethylene/tetrafluoroethylene type copolymer (hereinafter referred to as ETFE), the methanol hydrophobizing degree is preferably from 45 to 70%. When the fluororesin is a hexafluoropropylene/tetrafluoroethylene type copolymer or a perfluoro(alkyl vinyl ether)-tetrafluoroethylene type copolymer, the methanol hydrophobizing degree is preferably from 60 to 75%. When the fluororesin is a tetrafluoroethylene/hexafluoropropylene/vinylidene fluoride type copolymer, the methanol hydrophobizing degree is preferably from 45 to 70%, more preferably from 55 to 70%.

When the methanol hydrophobizing degree is within the range, the compatibility of the hydrophobized silicon oxide-coated metal oxide particles to the fluororesin would be good, and the dispersibility of the hydrophobized silicon oxide-coated metal oxide particles to the fluororesin would be good. As a result, the hydrophobized silicon oxide-coated metal oxide particles are hardly agglomerated in the fluororesin, and the transparency of the fluororesin film would be good.

The silicon oxide-coated metal oxide particles which are not primarily hydrophobized and secondarily hydrophobized have a methanol hydrophobizing degree of less than 10%. Since the dispersibility of the particles in the fluororesin is low, the transparency of the fluororesin film obtainable is low.

The methanol hydrophobizing degree is an index showing the hydrophobicity of the hydrophobized silicon oxide-coated metal oxide particles. The method of measuring the methanol hydrophobizing degree is as follows.

Into a 300 mL beaker, 50 mL of distilled water is put, and while the distilled water is thoroughly stirred, 5 g of the hydrophobized silicon oxide-coated metal oxide particles are added. If such particles are uniformly dispersed in the distilled water, such particles are well compatible with the distilled water, and the methanol hydrophobizing degree is 0%. In a case where the particles are not uniformly dispersed in the distilled water, methanol is gradually dropwise added to the distilled water. The methanol hydrophobizing degree D (unit: %) is obtained by the following formula from the total amount M (unit: mL) of methanol added until the particles are uniformly dispersed in the methanol aqueous solution.

$$D=100M/(M+50)$$

Here, in the measurement of the methanol hydrophobizing degree, the hydrophobizing degree of the agglomerated particles is measured, and it should be understood that the measurement is not necessarily be useful for confirming that the portion around the primary particles is coated with e.g. the alkyl groups.

The hydrophobized silicon oxide-coated metal oxide particles of the present invention as mentioned above, is one obtained by the process of the present invention, and therefore dispersibility in the fluororesins, durability to fluorinated compounds and ultrabiolet-shielding properties are excellent.

Fluororesin Film

The fluororesin film of the present invention is a film comprising the hydrophobized silicon oxide-coated metal oxide particles of the present invention and a fluororesin.

The fluororesin may, for example, be a vinyl fluoride polymer, a vinylidene fluoride polymer, a tetrafluoroethylene/hexafluoropropylene/vinylidene fluoride type copolymer, a tetrafluoroethylene/propylene copolymer, a tetrafluoroethylene/hexafluoropropylene/propylene copolymer, ETFE, a hexafluoropropylenetetrafluoroethylene copolymer or a perfluoro(alkyl vinyl ether)-tetrafluoroethylene type copolymer may, for example, be mentioned, and from the viewpoint of the transparency, processability and weather resistance, ETFE is preferred.

The content of the hydrophobized silicon oxide-coated metal oxide particles in the fluororesin film of the present invention may be properly set depending upon e.g. ultraviolet-shielding properties, film thickness and span for its use required. For example, when the film is formed to be thin, it is necessary to add the hydrophobized silicon oxide-coated metal oxide particles at a high concentration. On the other hand, when the film is formed to be thick, the hydrophobized silicon oxide-coated metal oxide particles may be added at a low concentration. If the transparency and the ultraviolet-shielding performance are almost the same level, the content of the hydrophobized silicon oxide-coated metal oxide particles per unit area is almost the same regardless of the thickness of the film.

The type and the content of the hydrophobized silicon oxide-coated metal oxide particles may properly be adjusted depending upon the purpose of the use, so as to adjust the transmittance of the ultraviolet light. For example, they may be set as follows.

When the thickness of the fluororesin film is 100 μm, the amount of such a ultraviolet-shielding metal oxide in the hydrophobized silicon oxide-coated metal oxide particles is preferably from 0.2 to 5.0 mass %, more preferably from 0.5 to 3.0 mass %, in the fluororesin film (100 mass %). When the amount of the ultraviolet-shielding metal oxide in the hydrophobized silicon oxide-coated metal oxide particles is at least 0.2 mass %, the ultraviolet-shielding properties of the fluororesin film would be good. When the amount of the ultraviolet-shielding metal oxide in the hydrophobized silicon oxide-coated metal oxide particles is at most 5.0 mass %, the ultraviolet-shielding performance in the fluororesin film would be sufficient. For example, in the case of the hydrophobized silicon oxide-coated zinc oxide particles, the amount of the hydrophobized silicon oxide-coated zinc oxide particles is preferably from 0.5 to 10.0 mass %, more preferably from 1.0 to 6.0 mass %, in the fluororesin film (100 mass %).

Further, in order to shield the ultraviolet light at the side of a short wavelength of about 300 nm, cerium oxide is preferred as the metal oxide, and in order to shield the ultraviolet light over a wide range of 360 nm or lower, it is preferred to employ zinc oxide, titanium oxide or iron oxide depending upon the transmittance of visible light to accomplish purposes. When higher transmittance of the visible light is needed, zinc oxide is preferred.

The fluororesin film may contain known additives (such as an organic type ultraviolet shielding agent or a filler) in order not to impair the effect of the present invention. However, the organic type ultraviolet shielding agent tends to be decomposed by the ultraviolet light, or effused by bleeding out, and therefore such a shielding agent is inferior in weather resistance to the hydrophobized silicon oxide-coated metal oxide particles of the present invention.

The light transmittance at 360 nm of the fluororesin film is preferably at most 5%, more preferably at most 1%. When the light transmittance at 360 nm of the fluororesin film is at most 5%, the ultraviolet light shielding properties are excellent.

Further, the light transmittance at 300 nm of the fluororesin film is preferably at most 5%, more preferably at most 1%. When the light transmittance at 300 nm of the fluororesin film is at most 5%, the ultraviolet shielding properties are excellent.

The light transmittances at 300 nm and 360 nm of the fluororesin film are measured by using a commonly available spectrophotometer.

When the light transmittances at 300 nm and 360 nm of the fluororesin film after the following accelerated exposure test is preferably an initial transmittance plus at most 5%, more preferably an initial transmittance plus at most 3% after the following accelerated exposure test. When the light transmittances at 300 nm and 360 nm of the fluororesin film after the accelerated exposure test are an initial transmittance plus at most 5%, the weather resistance is excellent.

The accelerated exposure test of the fluororesin film is carried out for 5,000 hours by using sunshine carbon in compliance with JIS A1415 as a light source.

The haze of the fluororesin film is preferably at most 15%, particularly preferably at most 10%.

When the haze of the fluororesin film is at most 15%, the transparency is excellent.

The haze of the fluororesin film is measured by using a commonly available haze meter.

The thickness of the fluororesin film is preferably from 6 to 500 μm, more preferably from 10 to 200 μm.

The fluororesin film of the present invention can be obtained in such a manner that the hydrophobized silicon oxide-coated metal oxide particles of the present invention and a fluororesin are mixed with each other, followed by molding by a known molding method. The hydrophobized silicon oxide-coated metal oxide particles may be agglomerated at a stage before mixing it with the fluororesin, but it is preferred that the agglomerate is pulverized so that they can readily be mixed with the fluororesin.

Since the fluororesin film as mentioned above contains a fluororesin, the weather resistance is excellent as compared with other general-purpose resin films.

Further, since the fluororesin film as mentioned above contains the hydrophobized silicon oxide-coated metal oxide particles of the present invention which is excellent in the dispersibility in the fluororesin, the hydrophobized silicon oxide-coated metal oxide particles are hardly agglomerated in the fluororesin film, and therefore they are hardly formed into large particles. As a result, the fluororesin film is excellent in the transparency.

Further, since the fluororesin film as mentioned above contains the hydrophobized silicon oxide-coated metal oxide particles of the present invention excellent in the durability to fluorinated compounds, the metal oxide particles never change to a metal fluoride by the fluorinated compound. As a result, the fluororesin film is excellent in the weather resistance.

Further, since the fluororesin film as mentioned above contains the hydrophobized silicon oxide-coated metal oxide particles of the present invention excellent in the ultraviolet shielding properties, the ultraviolet-shielding properties are excellent.

EXAMPLES

Now, the present invention will be described in further detail with reference to Examples, but it should be understood that the present invention is by no means restricted thereto.

Examples 1 to 3 and 5 to 16 are Examples of the present invention, and Examples 17 to 21 are Comparative Examples.

Particle Size of Metal Oxide Particles

Regarding the dispersion of a metal oxide, by using a particle size distribution measuring apparatus (MICROTRAC 9340UPA, manufactured by NIKKISO CO., LTD), the particle size distribution of the metal oxide on volume base was measured, and from the particle size distribution, an average particle size, a 90% particle size and a 10% particles size were obtained.

Methanol Hydrophobizing Degree

Into a 300 mL beaker, 50 mL of distilled water was put, and while the distilled water was thoroughly stirred, 5 g of particles were added. Methanol was gradually dropwise added to the distilled water, and the methanol hydrophobizing degree D (unit: %) was obtained by the following formula from the total amount M (unit: mL) of methanol added until the particles were uniformly dispersed in the methanol aqueous solution.

$$D=100M/(M+50)$$

Haze

In compliance with JIS K7105, the haze of the fluororesin film was measured three times by using a hazemeter (hazemeter HGM-2K, manufactured by Suga Test Instruments Co., Ltd.) to obtain an average value thereof.

Light Transmittances at 300 nm and 360 nm

In compliance with JIS K7105, the light transmittances at 300 nm and 360 nm of the fluororesin film were measured by using a spectrophotometer (UV-3100PC, manufactured by Shimadzu Corporation).

Accelerated Exposure Test

The fluororesin film was subjected to an accelerated exposure test for from 1,200 to 10,000 hours by using, as a light source, sunshine carbon in compliance with JISA1415. The light transmittances at 300 nm and 360 nm of the fluororesin film during the accelerated exposure test and after the test were measured by using a spectrophotometer (UV-3100PC, manufactured by Shimadzu Corporation).

Example 1

Production of Hydrophobized Silicon Oxide-Coated Zinc Oxide Particles

Zinc oxide particles (FZO-50, manufactured by Ishihara Sangyo Kaisha, Ltd.) were dispersed in water by a beads mill to obtain a dispersion (solid content concentration: 20 mass %) of zinc oxide particles. The average particle size, 90% particles size and 10% particle size of the zinc oxide particles in the dispersion of the zinc oxide particles are shown in Table 1.

Step (a):

While 336 g of the dispersion was thoroughly stirred, 491 g of water and 506 g of a mixed alcohol reagent (AP1, manufactured by Japan Alcohol Trading Co., Ltd., ethanol: 85.5 mass %, methanol: 1.1% and isopropanol: 13.4 mass %) were added to the dispersion, and the dispersion was heated up to 30° C. Then, the pH of the dispersion was adjusted to 9.5 by using a 28 mass % aqueous ammonia (manufactured by KANTO CHEMICAL CO., INC.), and then 156 g (66.9 parts by mass as calculated as $SiO_2$, based on 100 parts by mass of zinc oxide particles) of TEOS (manufactured by KANTO CHEMICAL CO., INC.) was added to the dispersion while the dispersion was stirred. Then, while a 28 mass % aqueous ammonia (manufactured by KANTO CHEMICAL CO., INC.) was added to the dispersion so that the pH of the dispersion would be changed from 9.4 to 9.6, the dispersion was stirred for 8 hours, and TEOS was hydrolyzed to deposit silicon oxide on the surface of the zinc oxide particles thereby to form a silicon oxide film, whereby 1,498 g of a dispersion of silicon oxide-coated zinc oxide particles having a solid content concentration of 7.5 mass % was obtained. The total amount of the aqueous ammonia added was 9.4 g. The concentration of the amount (as calculated as $SiO_2$) of a silicon oxide precursor in the dispersion was 0.54 milli equivalent/L, and the thickness of the silicon oxide film calculated from the surface area of the zinc oxide particles obtained by a nitrogen adsorption method and the amount of TEOS added, was 5.5 nm.

Step (b):

90 g of the dispersion of the silicon oxide-coated zinc oxide particles was heated up to 60° C., and then 1.95 g of TEOS (manufactured by KANTO CHEMICAL CO., INC.) and 0.24 g of isobutyltrimethoxysilane (AY43-048, manufactured by Dow Corning Toray Silicone Co., Ltd.) were added to the dispersion almost at the same time. While a 1 N aqueous ammonia (manufactured by KANTO CHEMICAL CO., INC.) was added to the dispersion so that the pH of the dispersion would be changed from 9.5 to 9.6, the dispersion was stirred for 20 minutes, and TEOS and isobutyltrimethoxysilane were hydrolyzed to be reacted with silicon oxide coating the zinc oxide particles, whereby 108 g of a dispersion of primarily hydrophobized silicon oxide-coated zinc oxide particles having a solid content concentration of 6.9 mass % was obtained. The amount of the 1 N aqueous ammonia added was 16.4 g. Here, the amount of isobutyltrimethoxysilane is 0.20 milli equivalent to 1 g of the silicon oxide-coated zinc oxide particles, and the amount of TEOS corresponds to 7.0 equivalent to 1 equivalent of isobutyltrimethoxysilane.

Step (c):

5 g of hexamethyldisilazane (TSL8802, manufactured by GE Toshiba Silicone Co., Ltd.) was added to the dispersion for 1 hour, the dispersion was stirred for 1 hour, and hexamethyldisilazane was hydrolyzed to be reacted with a silanol group remaining in the primarily hydrophobized silicon oxide-coated metal oxide particles, whereby 113 g of a dispersion of secondarily hydrophobized silicon oxide-coated zinc oxide particles having a solid content concentration of 6.7 mass % was obtained. Further, the amount of hexamethyldisilazane added was 67 parts by mass based on 100 parts by mass of the primarily hydrophobized silicon oxide-coated zinc oxide particles.

Step (d):

The dispersion was charged into an aluminum dish and left to stand for drying at 120° C. to obtain an agglomerate of the hydrophobized silicon oxide-coated zinc oxide particles. The agglomerate was so fragile that it was easily broken when pushed with fingers. The agglomerate was put in a plastic bag and lightly pressed with fingers to obtain hydrophobized silicon oxide-coated zinc oxide particles. The methanol hydrophobizing degree of the hydrophobized silicon oxide-coated zinc oxide particles was shown in Table 1.

Production of Fluororesin Film 35 g of ETFE (C-88AXP, manufactured by Asahi Glass Company, Limited) and 1.2 g (3.4 parts by mass as hydrophobized silicon oxide-coated zinc oxide particles and 1.9 parts by mass as zinc oxide, based on 100 parts by mass of ETFE) of hydrophobized silicon oxide-coated zinc oxide particles were kneaded under conditions at 280° C. at 100 rpm for 10 minutes by labo plastomill to obtain a mixture. The mixture was pressed at 295° C. for 5 minutes to obtain a 100 μm-thick fluororesin film. The haze of the film, the initial light transmittance at 360 nm, and the light transmittances at 360 nm during the accelerated exposure test and after the test are shown in Table 1.

Example 2

Production of Hydrophobized Silicon Oxide-Coated Zinc Oxide Particles

Zinc oxide particles (FZO-50, manufactured by Ishihara Sangyo Kaisha, Ltd.) were dispersed in water by a beads mill to obtain a dispersion (solid content concentration: 20 mass %) of the zinc oxide particles. The average particle size, 90% particle size and 10% particle size of the zinc oxide particles in the dispersion of the zinc oxide particles are shown in Table 1.

Step (a):

While 336 g of the dispersion was thoroughly stirred, 553 g of water and 444 g of a mixed alcohol reagent (AP1, manufactured by Japan Alcohol Trading Co., Ltd.) were added to the dispersion, and the dispersion was heated up to 35° C. Then, the pH of the dispersion was adjusted to 9.5 using a 28 mass % aqueous ammonia (manufactured by KANTO CHEMICAL CO., INC.), and then 156 g (66.9 parts by mass as calculated as $SiO_2$, based on 100 parts by mass of zinc oxide particles) of TEOS was added to the dispersion with stirring. Then, the dispersion was stirred for 8 hours while a 28 mass % aqueous ammonia (manufactured by KANTO CHEMICAL CO., INC.) was added to the dispersion so that the pH of the dispersion would be changed from 9.4 to 9.6, and silicon oxide was deposited on the surface of the zinc oxide particles by hydrolyzing TEOS thereby to form a silicon oxide film, whereby 1,498 g of a dispersion of silicon oxide-coated zinc oxide particles having a solid content concentration of 7.5 mass % was obtained. The total amount of the aqueous ammonia added was 9.6 g. The concentration in the amount (as calculated as $SiO_2$) of a silicon oxide precursor in the dispersion was 0.54 milli equivalent/L, and the thickness of the silicon oxide film calculated from the surface area of the zinc oxide particles obtained by a nitrogen adsorption method and the amount of TEOS added was 4.0 nm.

Step (b):

After the dispersion was heated up to 60° C., 31.4 g of TEOS (manufactured by KANTO CHEMICAL CO., INC.) and 3.2 g of isobutyltrimethoxysilane (AY43-048, manufactured by Dow Corning Toray Silicone Co., Ltd.) were added almost the same time to the dispersion. The dispersion was stirred for 20 minutes while a 28 mass % aquoues ammonia (manufactured by KANTO CHEMICAL CO., INC.) was added to the dispersion so that the pH of the dispersion would be changed from 9.4 to 9.6, and TEOS and isobutyltrimethoxysilane were hydrolyzed to be reacted with silicon oxide coating the zinc oxide particles, whereby 1,545 g of a dispersion of primarily hydrophobized silicon oxide-coated zinc oxide particles having a solid content concentration of 8.0 mass % was obtained. The amount of an aqueous ammonia added was 12.0 g. Here, the amount of isobutyltrimethoxysilane corresponds to 0.16 milli equivalent to 1 g of silicon oxide-coated zinc oxide particles, and the amount of TEOS corresponds to 8.4 equivalent to 1 equivalent of isobutyltrimethoxysilane.

Step (c):

80.6 g of hexamethyldisilazane (TSL8802, manufactured by GE Toshiba Silicone Co., Ltd.) was added to the dispersion, the dispersion was stirred for 1.5 hours, and hexamethyldisilazane was hydrolyzed to be reacted with a silanol group remaining in the primarily hydrophobized silicon oxide-coated metal oxide particles, whereby 1,626 g of a dispersion of secondarily hydrophobized silicon oxide-coated zinc oxide particles having a solid content concentration of 7.6 mass % was obtained. Here, the amount of hexamethyldisilazane added was 65.2 parts by mass based on 100 parts by mass of the primarily hydrophobized silicon oxide-coated zinc oxide particles.

Step (d):

The dispersion was dried under conditions of inlet temperature: 130° C. and outlet temperature: 75° C. by using a spray dryer (GS-310, manufactured by Yamato Scientific Co., Ltd.) to obtain 110 g of hydrophobized silicon oxide-coated zinc oxide particles. The methanol hydrophobizing degree of the hydrophobized silicon oxide-coated zinc oxide particles is shown in Table 1.

Production of Fluororesin Film

A 100 μm-thick fluororesin film was obtained in the same manner as in Example 1 except that hydrophobized silicon oxide-coated zinc oxide particles were used. The amount of the hydrophobized silicon oxide-coated zinc oxide particles was 3.4 parts by mass, and 1.9 parts by mass as zinc oxide, based on 100 parts by mass of ETFE. The haze of the film, the initial light transmittance at 360 nm, and the light transmittances at 360 nm during the accelerated exposure test and after the test are shown in Table 1.

Example 3

Production of Hydrophobized Silicon Oxide-Coated Zinc Oxide Particles

Zinc oxide particles (FZO-50, manufactured by Ishihara Sangyo Kaisha, Ltd.) were dispersed in water by a beads mill to obtain a dispersion (solid content concentration: 20 mass %) of the zinc oxide particles. The average particle size, 90% particle size and 10% particle size of the zinc oxide particles in the dispersion of the zinc oxide particles are shown in Table 1.

Hydrophobized silicon oxide-coated zinc oxide particles were obtained in the same manner as in Example 2 except that the above dispersion was used and further isobutyltrimethoxysilane was changed to hexyltrimethoxysilane (AY43-206M, manufactured by Dow Corning Toray Silicone Co., Ltd.). The amount of hexyltrimethoxysilane corresponds to 0.14 milli equivalent to 1 g of the silicon oxide-coated zinc oxide particles, and the amount of TEOS corresponds to 9.7 equivalent to 1 equivalent of hexyltrimethoxysilane. The amount of hexamethyidisilazane to be added was 67 parts by mass based on 100 parts by mass of the primarily hydrophobized silicon oxide-coated zinc oxide particles. The thickness of the silicon oxide film calculated from the surface area of the zinc oxide particles obtained by the nitrogen adsorption method and the amount of TEOS, was 6.8 nm. The methanol hydrophobizing degree of the hydrophobized silicon oxide-coated zinc oxide particles is shown in Table 1.

Production of Fluororesin Film

A 100 μm-thick fluororesin film was obtained in the same manner as in Example 1 except that hydrophobized silicon oxide-coated zinc oxide particles were used. The amount of the hydrophobized silicon oxide-coated zinc oxide particles was 3.4 parts by mass, and 1.9 parts by mass as zinc oxide, based on 100 parts by mass of ETFE. The haze of the film, the initial light transmittance at 360 nm, and the light transmittances at 360 nm during the accelerated exposure test and after the test are shown in Table 1.

Example 4

Production of Fluororesin Film

A 100 µm-thick fluororesin film was obtained in the same manner as in Example 1 except that the amount of the hydrophobized silicon oxide-coated zinc oxide particles was changed to 0.5 g. The amount of the hydrophobized silicon oxide-coated zinc oxide particles was 1.4 parts by mass, and 0.78 parts by mass as zinc oxide, based on 100 parts by mass of ETFE. The haze of the film, the initial light transmittance at 360 nm, and light transmittances at 360 nm during the accelerated exposure test and after the test are shown in Table 1.

Example 5

A fluororesin film was obtained in the same manner as in Example 3 except that the amount of the hydrophobized silicon oxide-coated zinc oxide particles was 0.53 g and the thickness of the film was 200 µm. The amount of the hydrophobized silicon oxide-coated zinc oxide particles was 1.5 parts by mass, and 0.83 parts by mass as zinc oxide, based on 100 parts by mass of ETFE. The haze of the film, the initial light transmittance at 360 nm, and light transmittances at 360 nm during the accelerated exposure test and after the test are shown in Table 1.

Example 6

Zinc oxide particles (FZO-50, manufactured by Ishihara Sangyo Kaisha, Ltd.) were dispersed in water by a beads mill to obtain a dispersion (solid content concentration: 20 mass %) of the zinc oxide particles. The average particle size, 90% particle size and 10% particle size of the zinc oxide particles in the dispersion of the zinc oxide particles are shown in Table 1.

Step (b):

500 g of a dispersion of silicon oxide-coated zinc oxide particles synthesized in the same manner as in Example 1 was heated up to 60° C., and then a mixture of 10.83 g of TEOS (manufactured by KANTO CHEMICAL CO., INC.) and 1.49 g of octyltriethoxysilane (Z6341, manufactured by Dow Corning Toray Silicone Co., Ltd.) was added to the dispersion. The dispersion was stirred for 20 minutes while a 28 mass % aqueous ammonia (manufactured by KANTO CHEMICAL CO., INC.) was added to the dispersion so that the pH of the dispersion would be changed from 9.5 to 9.6, and TEOS and octyltriethoxysilane were hydrolyzed to be reacted with silicon oxide coating the silicon oxide particles, whereby 515 g of a dispersion of the primarily hydrophobized silicon oxide-coated zinc oxide particles having a solid content concentration of 8.1 mass % was obtained. The amount of an aqueous ammonia added was 3.2 g. Further, the amount of octyltriethoxysilane is 0.14 milli equivalent to 1 g of silicon oxide-coated zinc oxide particles, and the amount of TEOS corresponds to 9.6 equivalent to 1 equivalent of octyltriethoxysilane.

Step (c):

529 g of a dispersion of secondarily hydrophobized silicon oxide-coated zinc oxide particles having a solid content concentration of 7.7 mass % was obtained in the same manner as in Example 1 except that the amount of hexamethyldisilazane was changed to 27.8 g. Here, the amount of hexamethyldisilazane to be added was 67 parts by mass, based on 100 parts by mass of the primarily hydrophobized silicon oxide-coated zinc oxide particles.

Step (d):

The same operation as in Example 1 was carried out by using the above dispersion, to obtain 30 g of hydrophobized silicon oxide-coated zinc oxide particles. The methanol hydrophobizing degree of the hydrophobized silicon oxide-coated zinc oxide particles is shown in Table 1.

Production of Fluororesin Film

A 100 µm-thick fluororesin film was obtained in the same manner as in Example 1 except that 35 g of ETFE (C-88AXP, manufactured by Asahi Glass Company, Limited) and 1.1 g (3.1 parts by mass as hydrophobized silicon oxide-coated zinc oxide particles and 1.8 parts by mass as zinc oxide, based on 100 parts by mass of ETFE) of the hydrophobized silicon oxide-coated zinc oxide particles were used. The haze of the film, the initial light transmittance at 360 nm, and the light transmittances at 360 nm during the accelerated exposure test and after the test are shown in Table 1.

Example 7

Step (a):

1,498 g of a dispersion of silicon oxide-coated zinc oxide particles having a solid content concentration of 7.5 mass % was obtained in the same manner as in Example 1 except that the same dispersion of the zinc oxide particles as in Example 6 was used, and 506 g of ethanol (manufactured by KANTO CHEMICAL CO., INC.) was added thereto instead of the mixed alcohol reagent. The amount of an aqueous ammonia added was 9.4 g. Further, the concentration of the amount (as calculated as $SiO_2$) in the dispersion was 0.54 milli equivalent/L.

Step (b):

500 g of the dispersion of the silicon oxide-coated zinc oxide particles was heated up to 60° C., and then a mixture of 10.83 g of TEOS (manufactured by KANTO CHEMICAL CO., INC.) and 1.04 g of ethyltriethoxysilane (manufactured by KANTO CHEMICAL CO., INC.) was added to the dispersion. The dispersion was stirred for 20 minutes while a 28 mass % aqueous ammonia (manufactured by KANTO CHEMICAL CO., INC.) was added to the dispersion so that the pH of the dispersion would be 9.5 to 9.6, and TEOS and ethyltriethoxysilane were hydrolyzed to be reacted with silicon oxide coating the zinc oxide particles, whereby 515 g of a dispersion of primarily hydrophobized silicon oxide-coated zinc oxide particles having a solid content concentration of 6.9 mass % was obtained. The amount of the aqueous ammonia added was 4.1 g. Here, the amount of ethyltriethoxysilane is 0.14 milli equivalent to 1 g of silicon oxide-coated zinc oxide particles, and the amount of TEOS corresponds to 9.6 equivalent to 1 g of silicon oxide-coated zinc oxide particles.

Step (c):

529 g of a dispersion of secondarily hydrophobized silicon oxide-coated zinc oxide particles having a solid content concentration of 7.7 mass % was obtained in the same manner as in Example 1 except that the amount of hexamethyldisilazane was 13.9 g. Here, the amount of hexamethyidisilazane added was 34 parts by mass based on 100 parts by mass of the primarily hydrophobized silicon oxide-coated zinc oxide particles.

Step (d):

By using the above dispersion, the same operation as in Example 1 was carried out to obtain 31 g of hydrophobized silicon oxide-coated zinc oxide particles were obtained. The methanol hydrophobizing degree of the hydrophobized silicon oxide-coated zinc oxide particles was shown in Table 1.
Production of Fluororesin Film A 100 μm-thick fluororesin film was obtained in the same manner as in Example 6. The amount of the hydrophobized silicon oxide-coated zing oxide particles was 3.1 parts by mass, and 0.8 parts by mass as zinc oxide, based on 100 parts by mass of ETFE. The haze and the initial light transmittance at 360 nm of the film are shown in Table 1.

Example 8

In the step (b), 512 g of a dispersion of primarily hydrophobized silicon oxide-coated zinc oxide particles having a solid content concentration of 8.0 mass % was obtained in the same manner as in Example 6 except that 0.73 g of methyltrimethoxysilane was used instead of 1.49 g octyltriethoxysilane. Further, the amount of an aqueous ammonia added was 2.4g. The amount of ethyltriethoxysilane is 0.14 milli equivalent to 1 g of silicon oxide-coated zinc oxide particles, and the amount of TEOS corresponds to 9.6 equivalent to 1 equivalent of ethyltriethoxysilane.

By using the dispersion of the primarily hydrophobized silicon oxide-coated zinc oxide particles obtained, the same operation as Example 6 was carried out to obtain 33 g of hydrophobized silicon oxide-coated zinc oxide particles.
Production of Fluororesin Film:

A 100 μm-thick fluororesin film was obtained in the same manner as in Example 6. The amount of the hydrophobized silicon oxide-coated zinc oxide was 3.1 parts by mass, and 1.8 parts by mass as zinc oxide, based on 100 parts by mass of ETFE. The haze and the initial light transmittance at 360 nm of the film are shown in Table 1.

Example 9

In the step (a), 1,540 g of a dispersion of primarily hydrophobized silicon oxide-coated zinc oxide particles having a solid content concentration of 7.3 mass % was obtained in the same manner as in Example 3 except that 198.0 g of tetraisopropoxysilane was used instead of tetraethoxysilane and the reaction time was changed to 24 hours.

In the step (b), 97 g of hydrophobized silicon oxide-coated zinc oxide particles was obtained in the same manner as in Example 3 except that the dispersion of the primarily hydrophobized silicon oxide-coated zinc oxide particles obtained was used and 39.9 g of tetraisopropoxysilane was used instead of tetraethoxysilane.
Production of Fluororesin Film A 100 μm-thick fluororesin film was obtained in the same manner as in Example 3. The amount of the hydrophobized silicon oxide-coated zinc oxide particles was 3.4 parts by mass, and 1.9 parts by mass as zinc oxide, based on 100 parts by mass of ETFE. The haze of the film and the initial light transmittance at 360 nm are shown in Table 1.

Example 10

In the step (c), 1,625 g of a dispersion of secondarily hydrophobized silicon oxide-coated zinc oxide particles having a solid content concentration of 7.6 mass % was obtained in the same manner as in Example 3 except that 80.2 g of trimethylmethoxysilane (TSLB111, manufactured by GE Toshiba Silicone Co., Ltd.) was used instead of 80.6 g of hexamethyldisilazane as a silanol protective agent. Here, the amount of trimethylmethoxysilane added was 64.9 parts by mass based on 100 parts by mass of the primarily hydrophobized silicon oxide-coated zinc oxide particles.
Step (d):

By using a rotary evaporator, the above dispersion was dried under reduced pressure while the temperature was increased to 70° C., whereby 122 g of hydrophobized silicon oxide-coated zinc oxide particles were obtained. The methanol hydrophobizing degree of the hydrophobized silicon oxide-coated zinc oxide particles is shown in Table 1.
Production of Fluororesin Film:

A 100 μm-thick fluororesin film was obtained in the same manner as in Example 6. The amount of the hydrophobized silicon oxide-coated zinc oxide particles was 3.1 parts by mass, and 1.8 parts by mass as zinc oxide, based on 100 parts by mass of ETFE. The haze of the film and the initial light transmittance at 360 nm are shown in Table 1.

Example 11

In the step (b), 512 g of a dispersion of primarily hydrophobized silicon oxide-coated zinc oxide particles having a solid content concentration of 8.0 mass % was obtained in the same manner as in Example 6 except that 0.65 g of dimethyldimethoxysilane (AY43-004, manufactured by Dow Corning Toray Silicone Co., Ltd.) was used instead of 1.49 g of octyltriethoxysilane. Further, the amount of an aqueous ammonia added was 2.6 g. Further, the amount of dimethyldimethoxysilane is 0.14 milli equivalent to 1 g of silicon oxide-coated zinc oxide particles, and the amount of TEOS corresponds to 9.6 equivalent to 1 equivalent of dimethyldimethoxysilane.

By using the dispersion of the primarily hydrophobized silicon oxide-coated zinc oxide particles obtained, the same operation as in Example 6 was carried out to obtain 30 g of hydrophobized silicon oxide-coated zinc oxide particles.
Production of Fluororesin Film:

A 100 μm-thick fluororesin film was obtained in the same manner as in Example 6. The amount of the hydrophobized silicon oxide-coated zinc oxide particles was 3.1 parts by mass, and 1.8 parts by mass as zinc oxide, based on 100 parts by mass of ETFE. The haze of the film and the initial light transmittance at 360 nm are shown in Table 1.

Example 12

In the step (b), 512 g of a dispersion of primarily hydrophobized silicon oxide-coated zinc oxide particles having a solid content concentration of 8.0 mass % was obtained in the same manner as in Example 6 except that 0.56 g of trimethylmethoxysilane (TSL8111, manufactured by GE Toshiba Silicone Co., Ltd.) was used instead of 1.49 g of octyltriethoxysilane.

Further, in the step (c), 529 g of a dispersion of secondarily hydrophobized silicon oxide-coated zinc oxide particles having a solid content concentration of 7.7 mass % was obtained in the same manner as in Example 6 except that 27.6 g of trimethylmethoxysilane was used instead of 27.8 9 of hexamethyldisilazane as a silanol protective agent. Further, the amount of an aqueous ammonia added was 3.29. Further, the amount of trimethylmethoxysilane is 0.14 milli equivalent to 1 g of silicon oxide-coated zinc oxide particles, and the amount of TEOS corresponds to 9.6 equivalent to 1 equivalent of trimethylmethoxysilane.

By using the dispersion of the secondarily hydrophobized silicon oxide-coated zinc oxide particles obtained, the same operation as in Example 6 was carried out to obtain 31 g of hydrophobized silicon oxide-coated zinc oxide particles. Further, the amount of an aqueous ammonia added was 1.9 g.
Production of Fluororesin Film:

A 100 μm-thick fluororesin film was obtained in the same manner as in Example 6. The amount of the hydrophobized silicon oxide-coated zinc oxide particles was 3.1 parts by mass, and 1.8 parts by mass as zinc oxide, based on 100 parts by mass of ETFE. The haze of the film and the initial light transmittance at 360 nm are shown in Table 1.

Example 13

In the step (b), 512 g of a dispersion of primarily hydrophobized silicon oxide-coated zinc oxide particles having a solid content concentration of 8.0 mass % was obtained in the same manner as in Example 6 except that 0.56 g of hexamethyldisilazane was used instead of 1.49 g of octyltriethoxysilane.

Further, the amount of an aqueous ammonia added was 1.4 g. Further, the amount of hexamethyldisilazane is 0.07 milli equivalent to 1 g of silicon oxide-coated zinc oxide particles, and the amount of TEOS corresponds to 19.2 equivalent to 1 equivalent of hexamethyidisilazane.

By using the dispersion of the primarily hydrophobized silicon oxide-coated zinc oxide particles obtained, the same operation as in Example 6 was carried out to obtain 30 g of hydrophobized silicon oxide-coated zinc oxide particles. Production of Fluororesin Film:

A 100 μm-thick fluororesin film was obtained in the same manner as in Example 6. The amount of the hydrophobized silicon oxide-coated zinc oxide particles was 3.1 parts by mass, and 1.8 parts by mass as zinc oxide, based on 100 parts by mass of ETFE. The haze of the film and the initial light transmittance at 360 nm are shown in Table 1.

Example 14

Production of Hydrophobized Silicon Oxide-Coated Iron Oxide Particles:

Iron oxide particles (L2915, manufactured by BASF Japan Ltd.) were dispersed in water by a beads mill to obtain a dispersion (solid content concentration: 20 mass %) of iron oxide particles. The average particle size, 90% particle size and 10% particle size of the iron oxide particles in the dispersion are shown in Table 1.

In the step (a), 99 g of hydrophobized silicon oxide-coated iron oxide particles were obtained in the same manner as in Example 2 except that the dispersion of zinc oxide was changed to the dispersion of iron oxide.
Production Of Fluororesin Film:

A 100 μm-thick fluororesin film was obtained in the same manner as in Example 1 except that the amount of the hydrophobized silicon oxide-coated iron oxide particles was 0.88 g. The amount of the hydrophobized silicon oxide-coated iron oxide particles was 2.5 parts by mass, and 1.4 parts by mass as iron oxide, based on 100 parts by mass of ETFE. The haze of the film, the initial light transmittance at 360 nm, and the light transmittances at 360 nm during the accelerated exposure test and after the test are shown in Table 1.

Further, the thickness of the silicon oxide film calculated from the surface area of the iron oxide particles obtained by a nitrogen adsorption method and the amount of TEOS obtained was 5.3 nm.

Example 15

Production of Hydrophobized Silicon Oxide-Coated Titanium Oxide Particles:

Titanium oxide particles (PT-401M, manufactured by Ishihara Sangyo Kaisha, Ltd.) were dispersed in water by a beads mill to obtain a dispersion (solid content concentration: 20 mass %) of titanium oxide particles. The average particles size, 90% particle size and 10% particle size of the titanium oxide particles in the dispersion are shown in Table 1.

In the step (a), the same operation as in Example 2 was carried out except that the dispersion of zinc oxide was changed to the dispersion of titanium oxide, whereby 100 g of hydrophobized silicon oxide-coated titanium oxide particles were obtained.
Production of Fluororesin Film:

A 100 μm-thick fluororesin film was obtained in the same manner as in Example 1 except that the amount of the hydrophobized silicon oxide-coated titanium oxide particles was changed to 0.6 g. The amount of the hydrophobized silicon oxide-coated titanium oxide particles was 1.7 parts by mass, and 0.96 parts by mass as titanium oxide, based on 100 parts by mass of ETFE. The haze of the film, the initial light transmittance at 360 nm, the light transmittances at 360 nm during the accelerated exposure test and after the test are shown in Table 1.

Further, the thickness of the silicon oxide film calculated from the surface area of the titanium oxide particles obtained by a nitrogen adsorption method and the amount of TEOS, was 4.5 nm.

Example 16

Production of Hydrophobized Silicon Oxide-Coated Cerium Oxide Particles:

Cerium oxide particles were dispersed in water to obtain a dispersion (solid content concentration: 20 mass %) of the cerium oxide particles. The average particle size, 90% particle size and 10% particle size of the cerium oxide particles in the dispersion are shown in Table 1.

In the step (a), the same operation as in Example 2 was carried out except that the dispersion of the zinc oxide was changed to the dispersion of cerium oxide, whereby 99 g of hydrophobized silicon oxide-coated cerium oxide particles were obtained.
Production of Fluororesin Film:

A fluororesin film was obtained in the same manner as in Example 3 except that the amount of the hydrophobized silicon oxide-coated cerium oxide particles was 0.83 g, and the thickness of the film was 200 μm. The amount of the hydrophobized silicon oxide-coated cerium oxide was 2.4 parts by mass, and 1.3 parts by mass as cerium oxide, based on 100 parts by weight of ETFE. The haze of the film, the initial light transmittance at 300 nm, and the light transmittances at 300 nm during the accelerated exposure test and after the test are shown in Table 1.

Example 17

Production of Silicon Oxide-Coated Zinc Oxide Particles:

The dispersion of the silicon oxide-coated zinc oxide particles obtained in the step (a) in Example 1 was dried in the same manner as in the step (d) in Example 2 to obtain silicon oxide-coated zinc oxide particles. The methanol hydrophobizing degree of the silicon oxide-coated zinc oxide particles was shown in Table 1.

Production of Fluororesin Film:

A 100 μm-thick fluororesin film was obtained in the same manner as in Example 1 except that the above silicon oxide-coated zinc oxide particles were used. The amount of the hydrophobized silicon oxide-coated zinc oxide particles was 3.4 parts by mass, and 2.1 parts by mass as zinc oxide, based on 100 parts by mass of ETFE. The film was so whitened that it is possible to visually confirm such an agglomerate. The haze of the film, the initial light transmittance at 360 nm, and the light transmittances at 360 nm during the accelerated exposure test and after the test are shown in Table 1.

Example 18

Production of Hydrophobized Silicon Oxide-Coated Zinc Oxide Particles:

Hydrophobized silicon oxide-coated zinc oxide particles were obtained in the same manner as in Example 1 except that the step (b) was omitted in Example 1. Further, the amount of hexamethyidisilazane added was 74 parts by mass based on 100 parts by mass of the silicon oxide-coated zinc oxide particles.

Production of Fluororesin Film:

A 100 μm-thick fluororesin film was obtained in the same manner as in Example 1 except that the above silicon oxide-coated zinc oxide particles were used. The amount of the hydrophobized silicon oxide-coated zinc oxide particles was 3.4 parts by mass, and 2.1 parts by mass as zinc oxide, based on 100 parts by mass of ETFE.

The haze of the film and the initial light transmittance at 360 nm are shown in Table 1. The transparency was poor.

Example 19

Production of Hydrophobized Silicon Oxide-Coated Zinc Oxide Particles:

Hydrophobized silicon oxide-coated zinc oxide particles were obtained in the same manner as in Example 1 except that the step (c) was omitted in Example 1.

Production of Fluororesin Film:

A 100 μm-thick fluororesin film was obtained in the same manner as in Example 1 except that the above silicon oxide-coated zinc oxide particles were used. The amount of the hydrophobized silicon oxide-coated zinc oxide particles was 3.4 parts by mass, and 1.9 parts by mass as zinc oxide, based on 100 parts by mass of ETFE.

The haze of the film and the initial light transmittance at 360 nm are shown in Table 1. The transparency was poor.

Example 20

Hydrophobized amorphous silica-coated zinc oxide particles and the fluororesin film as disclosed in Patent Document 2 were produced as follows.

Production of Hydrophobized Amorphous Silica-Coated Zinc Oxide Particles:

While carbonic acid gas was blown into a 20 mass % aqueous zinc chloride solution, sodium bicarbonate was added thereto to obtain slightly whitened slurry of zinc carbonate. A particle size of zinc carbonate was from 0.05 to 0.02 μm. After the zinc carbonate was thoroughly washed with water, the dispersion of the zinc carbonate was kept at 60° C., and an ethanol solution containing 20 mass % of tetraethyl silicate was dropwise added to the dispersion with stirring to deposit amorphous silica on the surface of the zinc carbonate particles. The amount of tetraethyl silicate dropwise added was 100 parts by mass as calculated as $SiO_2$, based on 100 parts by mass of zinc carbonate. The dispersion was stirred for at least 1 hour, and then dilute nitric acid was added to the dispersion for neutralization thereby to complete the coating of zinc carbonate with the amorphous silica.

Then, subsequent to the steps of washing with water, drying and pulverizing, such an amorphous silica-coated zinc carbonate was fired at 500° C. for 1 hour to obtain composite particles having the amorphous silica-coated zinc oxide particles aggregated. The composition of the composite particles was such that $ZnO/SiO_2=100/120$ (mass ratio). Further, the particle size distribution of the composite particles was measured by using a laser diffraction/scattering type particle size distribution measuring apparatus (LMS-24, manufactured by SEISHIN ENTERPRISE CO., LTD.), whereby it was found that at least 95% of the particles were distributed in the range of from 1 to 30 μm, and an average particle size thereof was 7.8 μm.

200 g of the composite particles were charged in a small size Henschel mixer, and then 40 g of solution obtained by letting 14 g of ethyltriethoxysilane dissolve in a mixed solvent of water/methanol=⅕ (mass ratio) was slowly charged therein, followed by stirring for 10 minutes. Then, wet composite particles which were surface-treated were dried at 120° C. for 1 hour to sufficiently break them into flakes for 2 minutes by the small Henschel mixer again to obtain hydrophobized amorphous silica-coated zinc oxide particles. The methanol hydrophobizing degree of the hydrophobized amorphous silica-coated zinc oxide particles was shown in Table 1.

Production of Fluororesin Film:

160 g of hydrophobized amorphous silica-coated zinc oxide particles and 4 kg of ETFE (C-88AX, manufactured by Asahi Glass Company, Limited) were dry-mixed by a V-mixer. The mixture was pelletized at 320° C. by a twin screw extruder. Then, the pellets were molded at 320° C. by a T-die system to obtain a 40 μm-thick fluororesin film. The amount of the hydrophobized silicon oxide-coated zinc oxide particles was 4.0 parts by mass, and 1.8 parts by mass as zinc oxide, based on 100 parts by mass of ETFE.

The haze of the film, the initial light transmittance at 360 nm, and the light transmittances during the accelerated exposure test and after the test are shown in Table 1. The film obtained was poor in transparency and weather resistance.

Example 21

In the step (b), 517 g of a dispersion of primarily hydrophobized silicon oxide-coated zinc oxide particles having a solid content concentration of 8.0 mass % was obtained in the same manner as in Example 6 except that 1.79 g of dodecyltriethoxysilane (KANTO CHEMICAL CO., INC.) was used instead of 1.49 g of octyltriethoxysilane.

Further, the amount of an aqueous ammonia added was 4.25 g. Further, the amount of dodecyltriethoxysilane was 0.14 milli equivalent to 1 g of the silicon oxide-coated zinc oxide particles, and the amount of TEOS corresponds to 9.7 equivalent to 1 equivalent of dodecyltriethoxysilane.

By using the dispersion of the primarily hydrophobized silicon oxide-coated zinc oxide particles obtained, the same operation as in Example 6 was carried out to obtain 33 g of hydrophobized silicon oxide-coated zinc oxide particles.

Production of Fluororesin Film:

A 100 μm-thick fluororesin film was obtained in the same manner as in Example 6. The amount of the hydrophobized silicon oxide-coated zinc oxide particles was 3.1 parts by mass, and 1.8 parts by mass as zinc oxide, based on 100 parts by mass of ETFE. The haze, and the initial light transmittance at 360 nm are shown in Table 1.

TABLE 1

| Ex. | Metal oxide | Metal oxide particles Average particle size (nm) | 90% Particle size (nm) | 10% Particle size (nm) | Hydrophobized particles Primarily hydrophobized particles | Secondarily hydrophobized particles | Methanol hydrophobizing degree (%) | Haze (%) | Fluororesin film Light transmittance at 360 nm (%) Initial | Accelerated exposure test (h) 1200 | 2500 | 5000 | 10000 |
|---|---|---|---|---|---|---|---|---|---|---|---|---|---|
| 1 | Zinc oxide | 35 | 80 | 22 | Present | Present | 60 | 9.8 | 0.49 | 0.71 | 0.76 | 0.88 | 1.13 |
| 2 | Zinc oxide | 26 | 49 | 16 | Present | Present | 60 | 6.3 | 0.52 | 0.74 | 0.79 | 0.92 | — |
| 3 | Zinc oxide | 44 | 84 | 26 | Present | Present | 60 | 7.3 | 0.30 | 0.40 | 0.45 | 0.54 | — |
| 4 | Zinc oxide | 35 | 80 | 22 | Present | Present | 60 | 6.1 | 20.8 | 21.6 | — | 22.5 | — |
| 5 | Zinc oxide | 44 | 84 | 26 | Present | Present | 60 | 9.5 | 0.84 | 0.98 | — | 1.09 | — |
| 6 | Zinc oxide | 39 | 71 | 21 | Present | Present | 55 | 13.6 | 1.24 | 1.52 | — | 1.78 | — |
| 7 | Zinc oxide | 39 | 71 | 21 | Present | Present | 60 | 14.8 | 0.66 | 0.89 | — | 0.95 | — |
| 8 | Zinc oxide | 39 | 71 | 21 | Present | Present | 60 | 6.9 | 0.88 | 1.06 | — | 1.27 | — |
| 9 | Zinc oxide | 44 | 84 | 26 | Present | Present | 60 | 9.9 | 0.48 | 0.65 | — | 0.84 | — |
| 10 | Zinc oxide | 44 | 84 | 26 | Present | Present | 60 | 6.4 | 0.83 | 1.02 | — | 1.22 | — |
| 11 | Zinc oxide | 39 | 71 | 21 | Present | Present | 50 | 8.0 | 0.50 | 0.64 | — | 0.86 | — |
| 12 | Zinc oxide | 39 | 71 | 21 | Present | Present | 45 | 6.4 | 0.67 | 0.89 | — | 0.93 | — |
| 13 | Zinc oxide | 39 | 71 | 21 | Present | Present | 50 | 7.4 | 0.49 | 0.65 | — | 0.82 | — |
| 14 | Iron oxide | 40 | 76 | 21 | Present | Present | 60 | 6.5 | 0.74 | 0.86 | — | 0.92 | — |
| 15 | Titanium oxide | 51 | 92 | 30 | Present | Present | 60 | 12.5 | 0.68 | 0.81 | — | 0.82 | — |
| 16 | Cerium oxide | 46 | 85 | 24 | Present | Present | 60 | 8.7 | 0.37 * 300 nm | 0.46 * 300 nm | — | 0.51 * 300 nm | — |
| 17 | Zinc oxide | 35 | 80 | 22 | Absent | Absent | At most 10 | 70.0 | 0.31 | 8.6 | — | 28.5 | — |
| 18 | Zinc oxide | 35 | 80 | 22 | Absent | Present | — | 36.0 | 0.12 | — | — | — | — |
| 19 | Zinc oxide | 35 | 80 | 22 | Present | Absent | — | 50.4 | 0.50 | — | — | — | — |
| 20 | Zinc oxide | — | — | — | Present | Absent | 65 | 18.5 | 20.0 | 23.5 | — | 30.3 | — |
| 21 | Zinc oxide | 39 | 71 | 21 | Present | Present | 60 | 20.3 | 0.89 | 1.05 | — | 1.14 | — |

INDUSTRIAL APPLICABILITY

A fluororesin film containing hydrophobized silicon oxide-coated metal oxide particles obtained by the process of the present invention is useful for e.g. agricultural house films and outdoor building material (such as roof materials).

The entire disclosure of Japanese Patent Application No. 2007-105702 filed on Apr. 13, 2007 including specification, claims and summary is incorporated herein by reference in its entirety.

What is claimed is:

1. A process for producing hydrophobized silicon oxide-coated metal oxide particles, which comprises:
   (a) adding a silicon oxide precursor to a dispersion of metal oxide particles to form a silicon oxide film on the surface of metal oxide particles thereby to obtain a dispersion of silicon oxide-coated metal oxide particles,
   (b) adding a compound represented by the following formula (1) or (2) and a silicon oxide precursor to the above dispersion of silicon oxide-coated metal oxide particles thereby to obtain a dispersion of primarily hydrophobized silicon oxide-coated metal oxide particles,

$$R^1{}_{4-n}Si(OR^2)_n \quad (1)$$

$$R^3{}_3Si-NH-SiR^3{}_3 \quad (2)$$

in the above formulae (1) and (2), $R^1$ is a $C_{1-9}$ alkyl group, each of $R^2$ and $R^3$ which are independent of each other, is an alkyl group, and n is an integer of from 1 to 3,
   (c) adding a silanol-protective agent to the above dispersion of primarily hydrophobized silicon oxide-coated metal oxide particles thereby to obtain a dispersion of secondarily hydrophobized silicon oxide-coated metal oxide particles, and
   (d) drying the above secondarily hydrophobized silicon oxide-coated metal oxide particles thereby to obtain the hydrophobized silicon oxide-coated metal oxide particles.

2. The process for producing hydrophobized silicon oxide-coated metal oxide particles according to claim 1, wherein in the dispersion of metal oxide particles, the 90% particle size of the metal oxide particles is from 10 to 100 nm.

3. The process for producing hydrophobized silicon oxide-coated metal oxide particles according to claim 1, wherein in the dispersion of metal oxide particles, the 90% particle size of the metal oxide particles is from 20 to 80 nm.

4. The process for producing hydrophobized silicon oxide-coated metal oxide particles according to claim 1, wherein the silicon oxide film in the hydrophobized silicon oxide-coated metal oxide particles has a thickness of from 1 to 20 nm.

5. The process for producing hydrophobized silicon oxide-coated metal oxide particles according to claim 1, wherein the metal oxide particles are zinc oxide particles.

6. The process for producing hydrophobized silicon oxide-coated metal oxide particles according to claim 1, wherein the silicon oxide precursor is tetraethoxysilane.

7. The process for producing hydrophobized silicon oxide-coated metal oxide particles according to claim 1, wherein $R^2$ in the formula (1) is a methyl group.

8. The process for producing hydrophobized silicon oxide-coated metal oxide particles according to claim 1, wherein the compound represented by the formula (1) is added and is isobutyltrimethoxysilane or hexyltrimethoxysilane.

9. The process for producing hydrophobized silicon oxide-coated metal oxide particles according to claim 1, wherein the compound represented by the formula (2) is added and is hexamethyldisilazane.

10. The process for producing hydrophobized silicon oxide-coated metal oxide particles according to claim 1, wherein the silanol-protective agent is hexamethyldisilazane.

11. The process for producing hydrophobized silicon oxide-coated metal oxide particles according to claim 1, wherein the metal oxide particles are present in the dispersion at a concentration of from 1 to 20 mass %.

12. The process for producing hydrophobized silicon oxide-coated metal oxide particles according to claim 1, wherein the amount of silanol-protective agent is from 1 to 200 parts by mass, based on 100 parts by mass of the primarily hydrophobized silicon oxide-coated metal oxide particles.

13. Hydrophobized silicon oxide-coated metal oxide particles obtained by the process as defined in claim 1.

14. The hydrophobized silicon oxide-coated metal oxide particles according to claim 13, which have a methanol hydrophobizing degree being from 45 to 75%.

15. A fluororesin film comprising hydrophobized silicon oxide-coated metal oxide particles obtained by the process as defined in claim 1 and a fluororesin.

16. The fluororesin film according to claim 15, which has a light transmittance at 360 nm being at most 5%, and further has a haze value being at most 15%.

17. The fluororesin film according to claim 15, which has a light transmittance at 300 nm being at most 5%, and further has a haze value being at most 15%.

18. The fluororesin film according to claim 15, wherein the fluororesin is an ethylene/tetrafluoroethylene type copolymer.

\* \* \* \* \*